Aug. 7, 1934.  K. HOWIE  1,968,945
CAM ELEMENT
Filed July 6, 1933
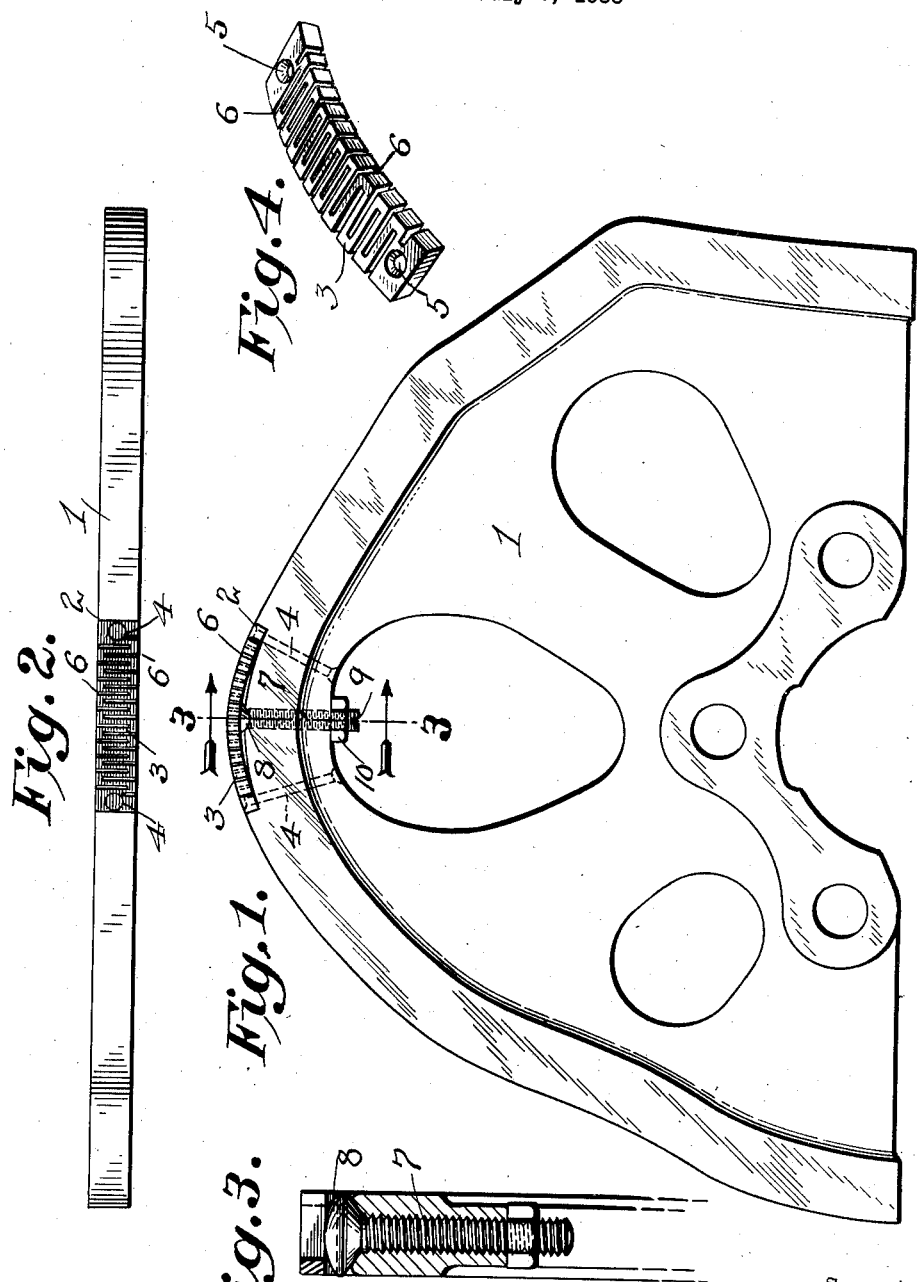
Inventor:
Kenneth Howie,
By Spear, Donaldson & Hall
Attorneys.

Patented Aug. 7, 1934

1,968,945

UNITED STATES PATENT OFFICE 1,968,945

CAM ELEMENT

Kenneth Howie, Norristown, Pa., assignor to Wildman Mfg. Co., Norristown, Pa., a corporation of Pennsylvania Application July 6, 1933, Serial No. 679,261

2 Claims. (Cl. 74—1)

The invention concerns a machine element for transmitting power with a camming action, one object of the invention being to provide a cam section which is adjustable, and which will provide, under all positions of adjustment, an uninterrupted surface for contact with the member upon which the camming action is imposed.

The invention consists in the features, combination and arrangement of parts hereinafter described and particularly pointed out in the claims.

In the accompanying drawing

Figure 1 is a side elevation of a portion of a cam adapted to be mounted on a shaft to be driven thereby, said camming member having an adjustable insert portion constituting the invention of the present application.

Fig. 2 is a plan view of Fig. 1.

Fig. 3 is a sectional view on the line 3—3 of Fig. 1.

Fig. 4 is a detached view of the adjustable cam insert member.

In the drawing 1 indicates a portion of a cam body, constituting in the present illustration one-half of said body adapted to be secured in any suitable manner to a cam shaft. This cam member has its periphery of the desired configuration to impart to a roller, lever, or other member the desired movements.

At the point 2 an insert member 3 is mounted by any suitable means such as rivets 4 passing through the openings 5 in the ends of the insert member, and suitably held by the body of the cam member. This insert member is of a thickness suitable to make a flush joint at its ends with the adjacent walls or shoulders of the recess 2. The insert piece is adapted to be adjusted in relation to the cam body so as to provide for the desired degree of movement to be imparted to the member which is to be operated by the cam.

In providing for this adjustment one of the main objects attained by this improvement is the maintenance of the flush joint between the ends of the adjustable insert member and the adjacent part of the main body of the cam so that a continuous or uninterrupted cam surface will be provided along the periphery of the cam body, and along the outer face or periphery of the insert member. For this purpose the insert member is provided with incisions or kerfs 6 which extend alternately from opposite edges of the insert member transversely thereof to near the other edge of the member.

For adjusting this insert piece, a screw 7 is mounted in the main body of the cam member, said screw having a head portion 8 to bear on the under side of the insert member at about the center of the length of said member. This screw may be turned by a kerf 9 in its end, and held by a lock nut 10.

By the provision of the slots or kerfs 6 distributed along the insert member in staggered relation to each other, flexibility of the insert piece is provided for, as well as sufficient extensibility to permit of the adjustment of what may be regarded as the high point of the cam inwardly or outwardly. The insert piece as thus constructed has sufficient resiliency that when the screw 7 is backed off the insert piece will contract in corresponding degree and thus lower the high point of the cam. When the screw is turned to move outwardly radially of the cam body, the head thereof will force the insert member at its central portion outwardly, and in this action the insert member will flex and stretch to the necessary degree.

In all adjustments it will be noted that the ends of the insert piece will maintain their relation to the adjacent portions of the main body of the cam member, and will maintain the flush joint so that there will be no depression or shoulder at the point where the end of the insert member abuts the adjacent portion of the main body, but on the contrary, a continuous unbroken cam track will be provided along the periphery of the main body, and of the insert piece. It will be noted that the kerfs extend from each edge of the cam member past the longitudinal center line thereof to near the opposite edge.

The invention is not limited to any particular cam body or carrier for the adjustable cam section or insert, the rotary body being shown as an example of one application of the invention, for convenience of illustration.

The cam section is formed of metal.

I claim:

1. In combination with a carrier member, a cam section applied thereto, said section comprising a strip like member having recesses extending transversely thereof and opening at the bearing face and at the face opposite therefrom, a set of said recesses extending from one edge of the strip to near the other edge, and another set of said recesses extending from the said other edge of the strip to near the first mentioned edge, said second set of recesses alternating with the first set of recesses, means for holding the ends of said section at a fixed distance apart to the carrier member, and means for adjusting said cam section relative to the carrier by flexing its intermediate portion.

2. In combination with a carrier member, a cam section applied thereto, said section comprising a strip like member having kerfs extending transversely thereof and opening at the bearing face and at the face opposite therefrom, a set of said kerfs extending from one edge of the strip to near the other edge, and another set of said kerfs extending from the said other edge of the strip to near the first mentioned edge, said second set of kerfs alternating with the first set of kerfs, means for holding the ends of said section at a fixed distance apart to the carrier member, and means for adjusting said cam section relative to the carrier by flexing its intermediate portion.

KENNETH HOWIE.